(12) United States Patent
Kim et al.

(10) Patent No.: US 12,273,033 B2
(45) Date of Patent: Apr. 8, 2025

(54) MODULAR HIGH POWER BI-DIRECTIONAL HALF BRIDGE BUCK/BOOST CONVERTER ASSEMBLY

(71) Applicant: PACIFIC FAST CHARGE CORPORATION, Riverside, CA (US)

(72) Inventors: David M D Kim, Ontario, CA (US); Philip Edmund Schaefer, Riverside, CA (US); German Rafael Nielsen Lopez, Victorville, CA (US); Matthew Jordan Serrano, Buena Park, CA (US)

(73) Assignee: Pacific Energy Inc., Riverside, CA (US)

( * ) Notice: Subject to any disclaimer, the term of this patent is extended or adjusted under 35 U.S.C. 154(b) by 0 days.

(21) Appl. No.: 18/522,963

(22) Filed: Nov. 29, 2023

(65) Prior Publication Data

US 2024/0097568 A1 Mar. 21, 2024

Related U.S. Application Data

(62) Division of application No. 17/521,671, filed on Nov. 8, 2021, now Pat. No. 12,062,983.

(51) Int. Cl.
*H02M 3/158* (2006.01)
*B60L 53/22* (2019.01)
(Continued)

(52) U.S. Cl.
CPC ........... *H02M 3/1582* (2013.01); *B60L 53/22* (2019.02); *H02J 7/007* (2013.01); *H02M 1/14* (2013.01);
(Continued)

(58) Field of Classification Search
CPC .. H02M 3/1582; H02M 7/219; H02M 7/2173; H02M 7/23; H02J 7/007
See application file for complete search history.

(56) References Cited

U.S. PATENT DOCUMENTS 7,933,694 B2 4/2011 Kato
10,763,752 B1* 9/2020 Li ..................... H02M 3/33523
(Continued)

FOREIGN PATENT DOCUMENTS

CN 101249806 A 8/2008
CN 110198032 A 9/2019
(Continued)

OTHER PUBLICATIONS

Notice of Allowance dated May 15, 2024 in related U.S. Appl. No. 17/521,671, 7 pages.

*Primary Examiner* — Kyle J Moody
*Assistant Examiner* — Jye-June Lee
(74) *Attorney, Agent, or Firm* — Rupam Bhar; Calderon Safran & Wright P.C.

(57) ABSTRACT

The present invention generally relates to a modular high power bi-directional half bridge buck/boost converter assembly and, in particular, to a system for converting power from one form of current (either AC or DC) to a differing level of voltage, either lower (buck) or higher (boost), to output a wave signal based on pulse wave modulation (PWM) switching control by means of an external digital controller and methods of operation. In particular, an inverter-converter system includes at least one half bridge module including a plurality of circuit components, at least one inductor which is connected to the at least one half bridge module and a power supply, and a controller which is configured to receive and send instructions to the at least one half bridge module for converting an input voltage to an output voltage and dynamically tune switching frequencies based on a load of the inverter-converter system.

7 Claims, 15 Drawing Sheets

(51) Int. Cl.
  *H02J 7/00* (2006.01)
  *H02M 1/14* (2006.01)
  *H02M 7/217* (2006.01)
  *H02M 7/219* (2006.01)
  *H02M 7/23* (2006.01)
  *H02M 7/797* (2006.01)
  *H02M 7/81* (2006.01)
  *H02M 1/42* (2007.01)
  *H02M 7/00* (2006.01)

(52) U.S. Cl.
  CPC ......... *H02M 7/2173* (2013.01); *H02M 7/219* (2013.01); *H02M 7/23* (2013.01); *H02M 7/797* (2013.01); *H02M 7/81* (2013.01); *B60L 2210/12* (2013.01); *B60L 2210/14* (2013.01); *H02M 1/4208* (2013.01); *H02M 7/003* (2013.01)

(56) References Cited

U.S. PATENT DOCUMENTS

| | | | |
|---|---|---|---|
| 2006/0261904 A1 | 11/2006 | Hanna | |
| 2015/0109824 A1* | 4/2015 | Chen | H02M 3/22 363/17 |
| 2018/0041060 A1* | 2/2018 | Walley | H02J 7/00 |
| 2018/0287498 A1* | 10/2018 | Yu | H02M 3/1582 |
| 2022/0190723 A1 | 6/2022 | Guo | |

FOREIGN PATENT DOCUMENTS

| | | |
|---|---|---|
| CN | 110224581 A | 9/2019 |
| WO | 2022038288 A1 | 2/2022 |

* cited by examiner

MODULAR HIGH POWER BI-DIRECTIONAL HALF BRIDGE BUCK/BOOST CONVERTER ASSEMBLY

BACKGROUND

The present invention generally relates to a modular high power bi-directional half bridge buck/boost converter assembly and, in particular, to a system for converting power from one form of current (either AC or DC) to a differing level of voltage, either lower (buck) or higher (boost), to output a wave signal based on pulse width modulation (PWM) switching control by means of an external digital controller and methods of operation.

SUMMARY

In an aspect of the invention, an inverter-converter system includes at least one half bridge module including a plurality of circuit components; at least one inductor which is connected to the at least one half bridge module and a power supply; and a controller which is configured to receive and send instructions to the at least one half bridge module for converting an input voltage to an output voltage and dynamically tune switching frequencies based on a load of the inverter-converter system.

In further aspects of the invention, a bi directional modular half bridge converter circuit includes at least one half bridge module including a plurality of circuit components; an inductor on a circuit board; at least one current sensor on a circuit board which is a connection between the inductor and the at least one half bridge module; and a gate driver board being mounted directly to the at least one half bridge module.

In another aspect, a method includes receiving an input value based on a load of an inverter-converter system; and dynamically adjusting a switching frequency based on the received input vale such that the switching frequency is above a predetermined frequency based on the load being below a predetermined load and the switching frequency is below the predetermined frequency based on the load being above the predetermined load.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1A:
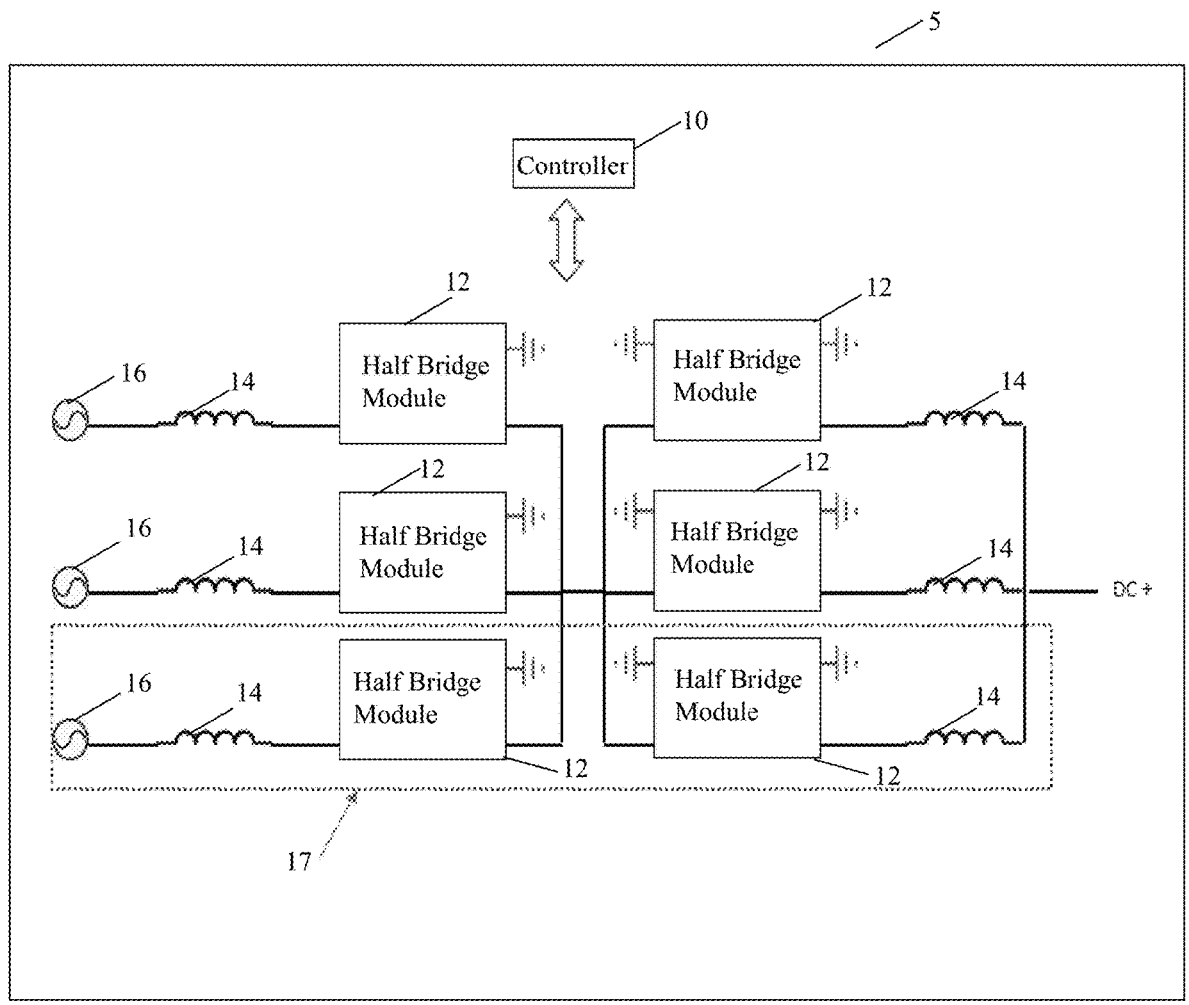
FIG. 1A shows a block diagram of an inverter-converter consisting of two channels and an optional third channel in accordance with aspects of the invention.

The present invention generally relates to a modular high power bi-directional half bridge buck/boost converter assembly and, in particular, to a system for converting power from one form of current (either AC or DC) to a differing level of voltage, either lower (buck) or higher (boost), to output a wave signal based on pulse width modulation (PWM) switching control by means of an external digital controller and methods of operation. The wave signal can be a variety of different wave forms, including but not limited to a sine wave signal, a square wave signal, or a constant wave signal based on the PWM switching control. In addition, the system of the present disclosure can have energy travel in one direction or in a bi-directional capability.

In the system of the present disclosure, the modular high power bi-directional half bridge buck/boost converter assembly includes a half bridge module and an inductor module. The half bridge module and the inductor module are the main components of the modular high power bi-directional half bridge buck/boost converter assembly in which electrical energy flows through. These modules can be arranged in a specific configuration to optimize a desired application of energy conversion. The energy conversion can include bi-directional functionality from DC to DC, bi-directional functionality from DC to AC, and bi-directional functionality from AC to DC. Further, the unique form factor of each module allows for configurability in a multitude of ways, including scaling of power through paralleling or series without a need for a unique circuit board layout. The modules and external control board are capable of different configurations with adjustments to a control logic.

In two or three channels of the assembly of the present disclosure, alternating currents (AC) can be rectified to a wide range of DC voltage outputs, or generated (i.e., inverted) from a wide range of DC supply currents to form a desired AC output root mean squared (RMS) voltage (or other desired wave signal output). The assembly of the present disclosure has the ability to provide a wide range of voltages (e.g., 150-1,000 V DC, 120-600 V AC) with desired output frequencies (e.g., 50 Hz, 60 Hz, etc.) and high current capability rating in a compact package through the use of high frequency switching equipment (i.e., 100 kHz range).

Advantageously, the present disclosure uses an assembly and control methods to improve performance, packaging, efficiency, and power density of power converts and allows a greater range of application through a wide range of voltage as well as AC or DC current capabilities while maintaining a modular design capable of interleaving assemblies for easily scaled power levels. These advantages are achieved by the use of a half bridge circuit topology with input filtering and capacitance, and high frequency (i.e., 100 kHz range) switching of metal-oxide-semiconductor field-effect transistor (MOSFET) controlled by an external control board with a processing unit, to run through an inductor an output a signal with additional signal filtering and capacitance. In the present disclosure, the circuit with MOSFETs can be used for either active switching or an idle diode in a current path that allows for bi-directional capability. In this scenario, a high voltage rating of the assembly refers to 1,000 V DC and high power refers to a power rating of 50,000 watts (at 1,000 V DC) constant operating capacity on a single channel.

The assembly of the present disclosure has several means of a control loop function and signal interpretation to provide switching control of a MOSFET and a buck or boost state of the assembly. In particular, the assembly of the present disclosure contains mirrored filtering and capacitance on either end which serves several functions: 1) greater capacitance that can help smooth out fluctuations in voltage from a supply side or a load side; and 2) provides a passive filter for noise that may be induced upon a circuit through switching of MOSFETs of the assembly. Further, by tuning a circuit of the assembly, extremely high efficiency is achieved. For example, the efficiency of the assembly can be approximately 98% overall at peak efficiency.

A combination of different capacitors in the present disclosure can provide a balanced level to prevent a fluctuating of instantaneous power in/out as well as a "ripple" generated by a high frequency switching circuit. Ripple current/voltage is a total amount of a root mean square (RMS) alternating and correct current/voltage that a capacitor can withstand without failing. The ripple needs to be filtered out to the degree that the peak current/voltage does not exceed the operating limitations of the devices on the circuit. In relation to a MOSFET switching module, a smoother switch node ripple with lower peaks allows for greater use of a component based on a voltage or a current rating. Further, by using the smoother switch node ripple, less input/output capacitance is needed and a smaller packaging can be implemented for the assembly. A gate switching ripple is directly correlated to the time it takes to fully switch on a MOSFET, in addition to the smoothness of the signal directly correlating with efficiency (i.e., less heat loss).

In the present disclosure, short duration switching allows for a higher useable frequency of switching, which compliments a quality output voltage/current ripple. The inductor that flows an output switched voltage/current in the circuit opposes a rate of change of current that may be present in the circuit, which provides a high quality of current output. All components in the circuitry improve efficiency performance, voltage rating, current capacity, and size in comparison to conventional circuits.

In the present disclosure, an inverter-converter system can be used in an electric vehicle or an electric vehicle application, internal or external to the vehicle, and provides for charging a vehicle battery or other rechargeable energy storage device and also allows a battery to be connected to an electric power grid to deliver power to a grid or otherwise be a source of power. In charge mode, the inverter-converter system is coupled with an AC power source, and the AC power source is converted to DC for charging the battery coupled with the inverter-converter system. Charging is a term that describes when a system is configured to convert the AC from a line to DC to charge a battery pack. Inverting is a term that describes when the system is configured to convert the DC voltage from the battery to AC power for a grid. Also, the inverter-converter system can be configured to provide a power source.

FIG. 1A shows a block diagram of an inverter-converter consisting of two channels and an optional third channel in accordance with aspects of the invention. In FIG. 1A, an inverter-converter system 5 includes a controller 10, a plurality of half bridge board modules 12, a plurality of inductors 14, and a plurality of AC power supplies 16. In the inverter converter-system 5, the dotted rectangular box 17 represents an optional third channel for a three phase power inversion. In another embodiment in which the dotted rectangular box 17 is not included, the inverter-converter system 5 can have two channels for a single phase AC, or a "split phase" sometimes referred to as "two phase" AC power inversion.

In FIG. 1A, each of the half bridge modules 12 can be connected to one of the inductors 14. Further, each of the inductors 14 can be connected to one of the AC power supplies 16 or a DC power supply (represented as DC+). Further, the half bridge modules 12 in a first channel (i.e., the highest half bridge modules 12 in the inverter converter system 5) are connected to the half bridge modules 12 in the second channel (i.e., the half bridge modules 12 in between the first channel and the third channel) and the third channel (i.e., the lowest half bridge modules 12 in the dotted rectangular box 17). Each of the half bridge modules 12 in a second channel (i.e., the half bridge modules 12 in between the first channel and the second channel) are connected to each other. The controller 10 of the inverter converter system 5 can both send and receive instructions to each of the half bridge modules 12. In an example, the controller 10 can adjust switching frequency of the inverter converter system 5.

Figure 1B:
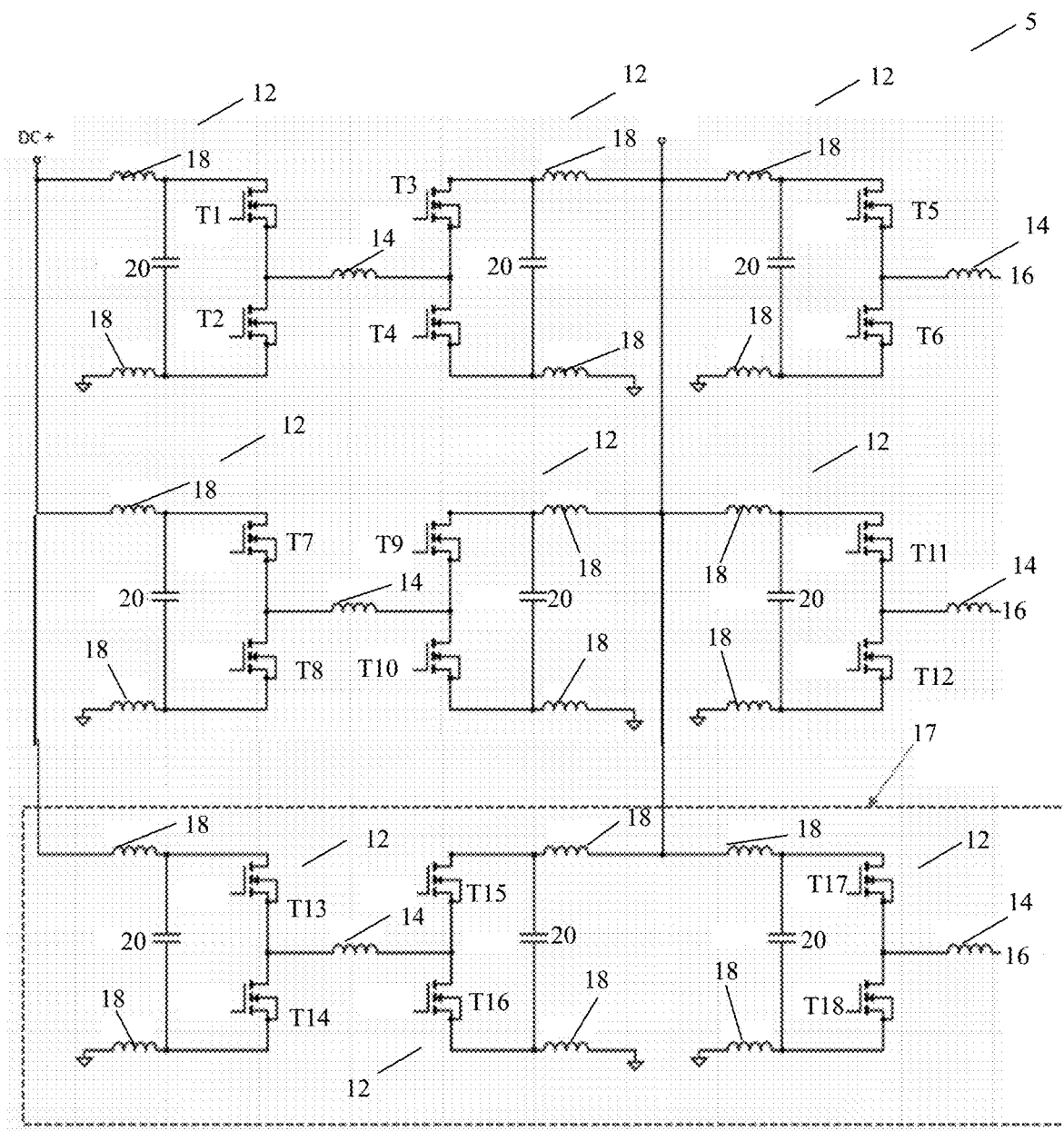
FIG. 1B shows a basic-inverter converter circuit schematic diagram of a two channel inverter-converter with an optional third channel in accordance with aspects of the present invention.

FIG. 1B shows a basic-inverter converter circuit schematic diagram of a two channel inverter-converter with an optional third channel in accordance with aspects of the present invention. FIG. 1B is a detailed circuit diagram of the block diagram of the inverter-converter system 5 in FIG. 1A. Therefore, the inverter-converter 5 of FIG. 1B is similar to FIG. 1A, with the exception of including the electrical circuit components of the half bridge modules 12. In FIG. 1B, the half bridge modules 12 of the first channel (i.e., the highest half bridge modules 12 in the inverter converter system 5) include transistors T1, T2, T3, T4, T5, and T6, inductors 14, AC power supply 16, EMI inductors 18, capacitors 20, and a DC power supply (represented as DC+). Further, the half bridge modules 12 of the second channel (i.e., the half bridge modules 12 in between the first channel and the third channel) include transistors T7, T8, T9, T10, T11, and T12, inductors 14, AC power supply 16, EMI inductors 18, capacitors 20, and a DC power supply (represented as DC+). The half bridge modules 12 of the optional third channel shown as the dotted rectangular box 17 includes transistors T13, T14, T15, T16, T17, and T18, inductors 14, AC power supply 16, EMI inductors 18, capacitors 20, and a DC power supply (represented as DC+).

In the inverter-converter system 5 of FIG. 1B, a single phase AC input (e.g., 120V AC in North America) or "split phase" (e.g., 240V AC in North America) may be a load or source of energy, depending on an application. In an instance of power inversion, in which a source of energy is a DC power source which may be a static or variable voltage and a load is in a form of AC power, current will first pass through a set of inductors, then through a set of interleaving half bridge switches (i.e., one set of switches for each channel), which depends on a DC supply voltage, and will either buck or boost voltage to a desired static DC buss voltage. On each half bridge module 12, a set of capacitors 20 helps sustain small variances in a voltage due to a variable power supply or load. Further, the inverter side of the inverter-converter system 5 can be split for each phase of AC power required, and each "channel" is response for a partial sine wave generation of two phases of AC power. Each of the channel's current can then pass through a final set of inductors, before making its way to a grid or load. An additional channel (e.g., a third channel) can be added to a pair, for an additional phase of power generation, and a fourth neutral channel can be added to a set of three for load balancing on a three phase circuit.

A path of current flow for converting AC to DC energy is the reverse of DC to AC with all of the same components. Each phase of the AC source passes through one of two channels of the inverter-converter system 5, depending on a position of an AC wave. The AC wave form is actively rectified which also conditions power factor on the AC line, and a voltage is boosted (compared to AC RMS voltage) to a higher DC positive and negative voltage onto the DC buss. Interleaving half bridge modules 12 can then further boost or buck down DC voltage to a desired output, and through a final set of inductors which smooth out "ripple" in the DC current generated.

Figure 2A:
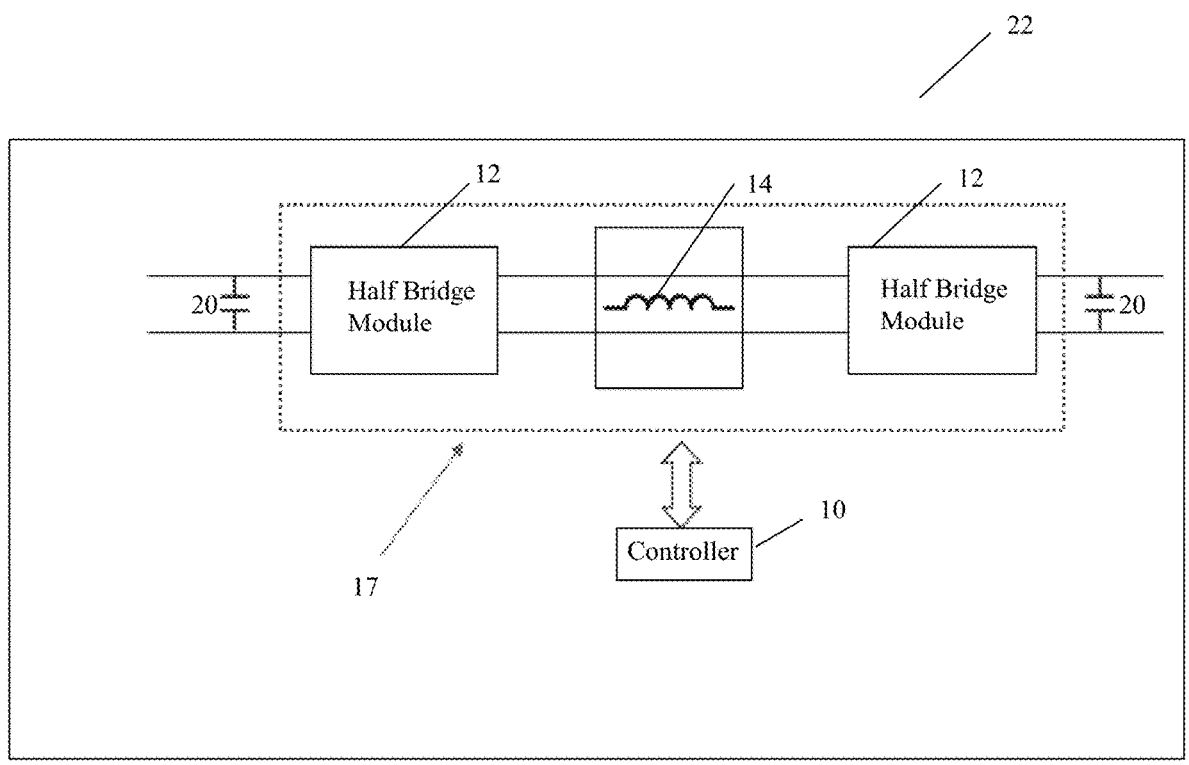
FIG. 2A shows a single channel buck/boost block diagram of a bi-directional buck/boost DC converter in accordance with aspects of the present invention.

FIG. 2A shows a single channel buck/boost block diagram of a bi-directional buck/boost DC converter in accordance with aspects of the present invention. The single channel buck/boost system 22 includes the half bridge modules 12, the inductors 14, and capacitors 20. The single channel in FIG. 2A is represented by the dotted rectangular box 17 (i.e., an optional third channel). In this configuration of FIG. 2A, the single channel buck/boost system 22 allows for DC to DC power conversion with only two half bridge modules 12 and a single inductor 14 between the two half bridge modules 12.

Figure 2B:
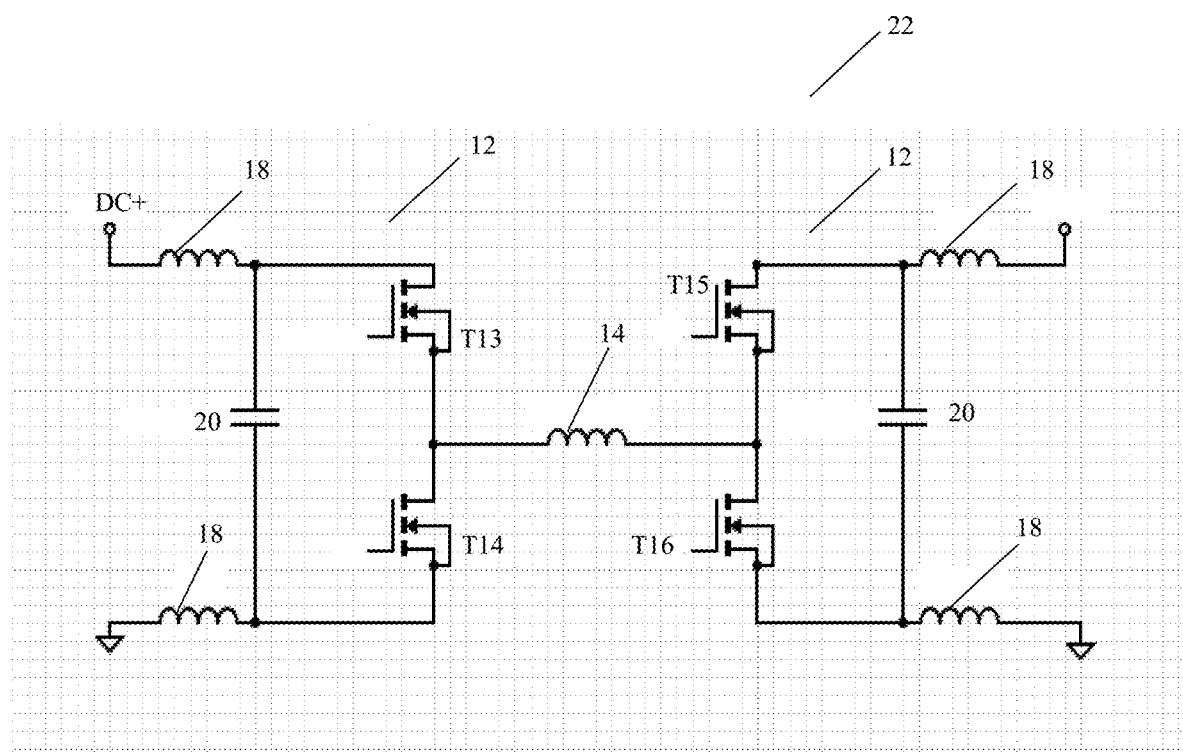
FIG. 2B shows a basic inverter-converter circuit schematic diagram of a single channel bi-directional buck/boost DC converter in accordance with aspects of the present invention.

FIG. 2B shows a basic inverter-converter circuit schematic diagram of a single channel bi-directional buck/boost DC converter in accordance with aspects of the present invention. FIG. 2B is a detailed circuit diagram of the single channel buck/boost system 22 in FIG. 2A. Therefore, the single channel buck/boost system 22 of FIG. 2B is similar to FIG. 2A, with the exception of including the electrical circuit components of the half bridge modules 12.

In FIGS. 1B and 2B, the half bridge modules 12 of the single channel (i.e., an optional third channel as represented by the dotted rectangular box 17) include transistors T13, T14, T15, and T16, inductors 14, EMI inductors 18, and capacitors 20. In FIG. 2B, a half bridge module 12 with the input capacitor 20 and the EMI inductor 18 is connected in series with an inductor 14, which is then connected in series with another half bridge module 12. In one direction of current flow, only one of the half bridge module 12 is actively switching while the another half bridge module 12 acts as a diode set.

Figure 3:
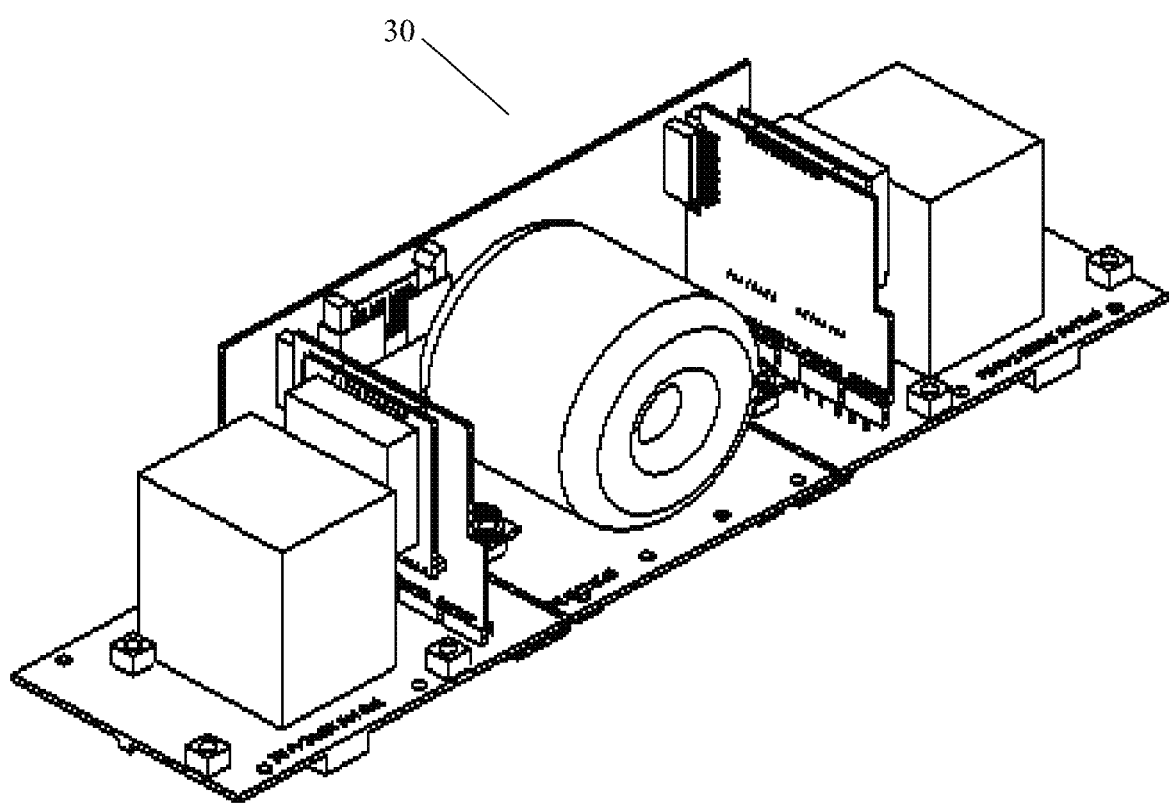
FIG. 3 show a single channel bi directional modular half bridge buck/boost converter assembly in accordance with aspects of the present invention.
Figure 4:
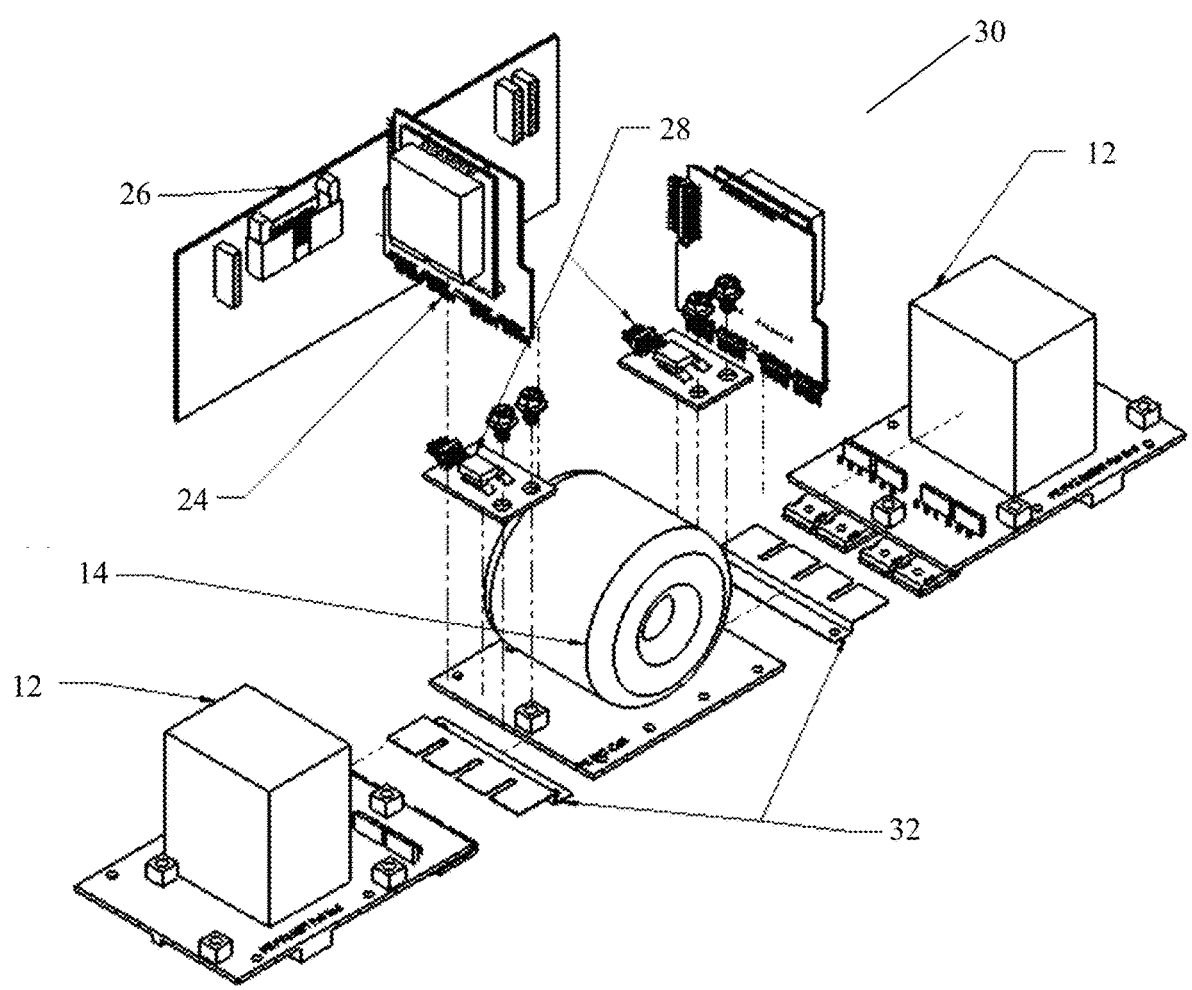
FIG. 4 shows a single channel bi directional modular half bridge buck/boost converter assembly exploded view in accordance with aspects of the present invention.

FIG. 3 show a single channel bi directional modular half bridge buck/boost converter assembly in accordance with aspects of the present invention. FIG. 4 shows a single channel bi directional modular half bridge buck/boost converter assembly exploded view in accordance with aspects of the present invention. In FIGS. 3 and 4, the single channel bi directional modular half bridge buck/boost converter 30 includes two half bridge modules 12, an inductor 14, a gate driver board 24, a gate driver signal board 26, current sensor boards 28, and MOSFET spring clips 32.

In particular, the single channel bi directional modular half bridge buck/boost converter 30 includes the gate driver signal board 26 which receives control means from an external unit (i.e., the external unit is not part of the single channel bi directional modular half bridge buck/boost converter 30) and provides switching control signals to each of the two gate driver boards 24. The inductor 14 and the half bridge module 12 are fixed to a heat sink mechanically by threaded spacers, washers, nuts, and spring clips.

The single channel bi directional modular half bridge buck/boost converter 30 can be controlled based on several means of feedback, which allows for a multitude of operating configurations. In particular, the single channel bi directional modular half bridge buck/boost converter 30 provides the ability of a user to define a desired type of control means and with several feedback criteria provided on the circuit itself, a variable or fixed target output can be achieved from a variable or fixed input. One such example would be a DC to DC configuration, whereas a variable power supply (such as a battery where voltage decreases as power is consumed) can provide a steady DC output at a voltage different from that which is provided. For DC to DC power conversion, bucking or boosting voltage is achieved by a pulse width modulation (PWM) switching signal sent to an appropriate module (i.e., the single channel bi directional modular half bridge buck/boost converter 30) to a degree that modulates an output voltage to a desired target. A voltage sensing circuit on an output end of the circuit sends a reference signal to an intermediate board, which then relays this to a control board (i.e., an external control board) for a control function.

Figure 5:
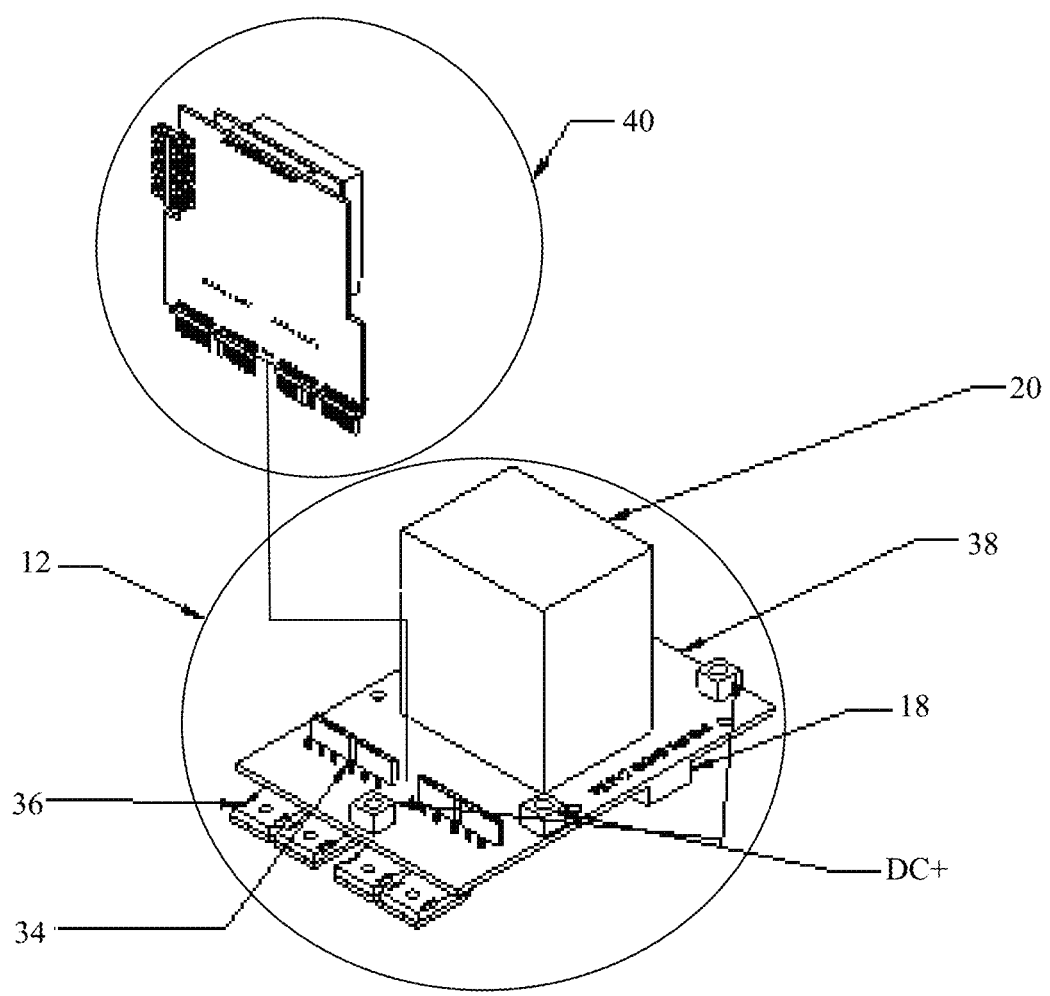
FIG. 5 shows a half bridge module assembly and gate driver board in accordance with aspects of the present invention.

FIG. 5 shows a half bridge module assembly and gate driver board in accordance with aspects of the present invention. In FIG. 5, the half bridge module 12 includes the EMI inductor 18, the capacitor 20, a gate driver pin header 34, a silicon high power MOSFET 36, a printed circuit board 38, and a power terminal (i.e., represented as DC+). In FIG. 5, a gate driver board 40 is connected to the half bridge module 12 through the gate driver pin header 34.

Figure 6A:
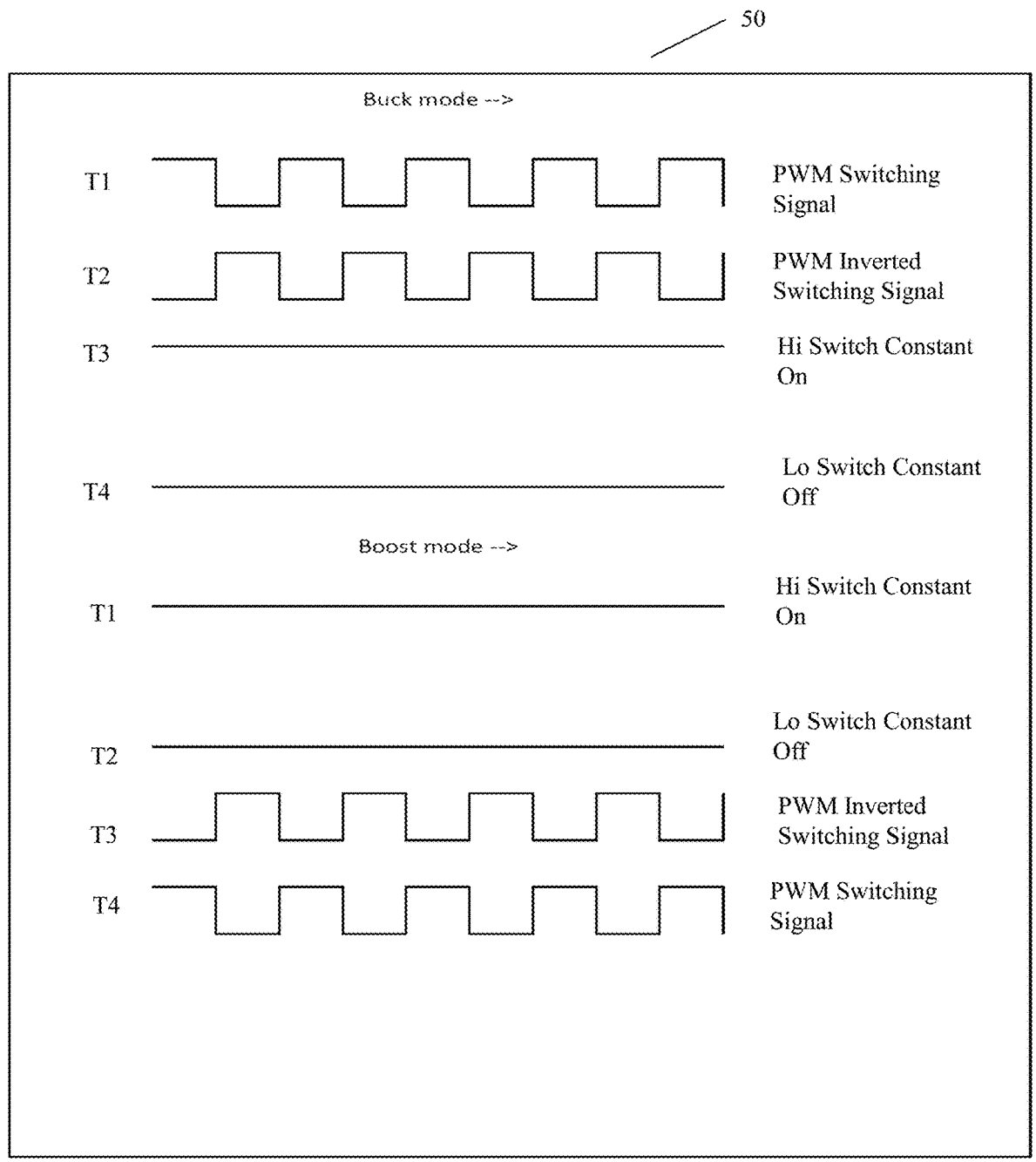
FIG. 6A shows a DC source buck and boosting switches in accordance with aspects of the present invention.
Figure 6B:
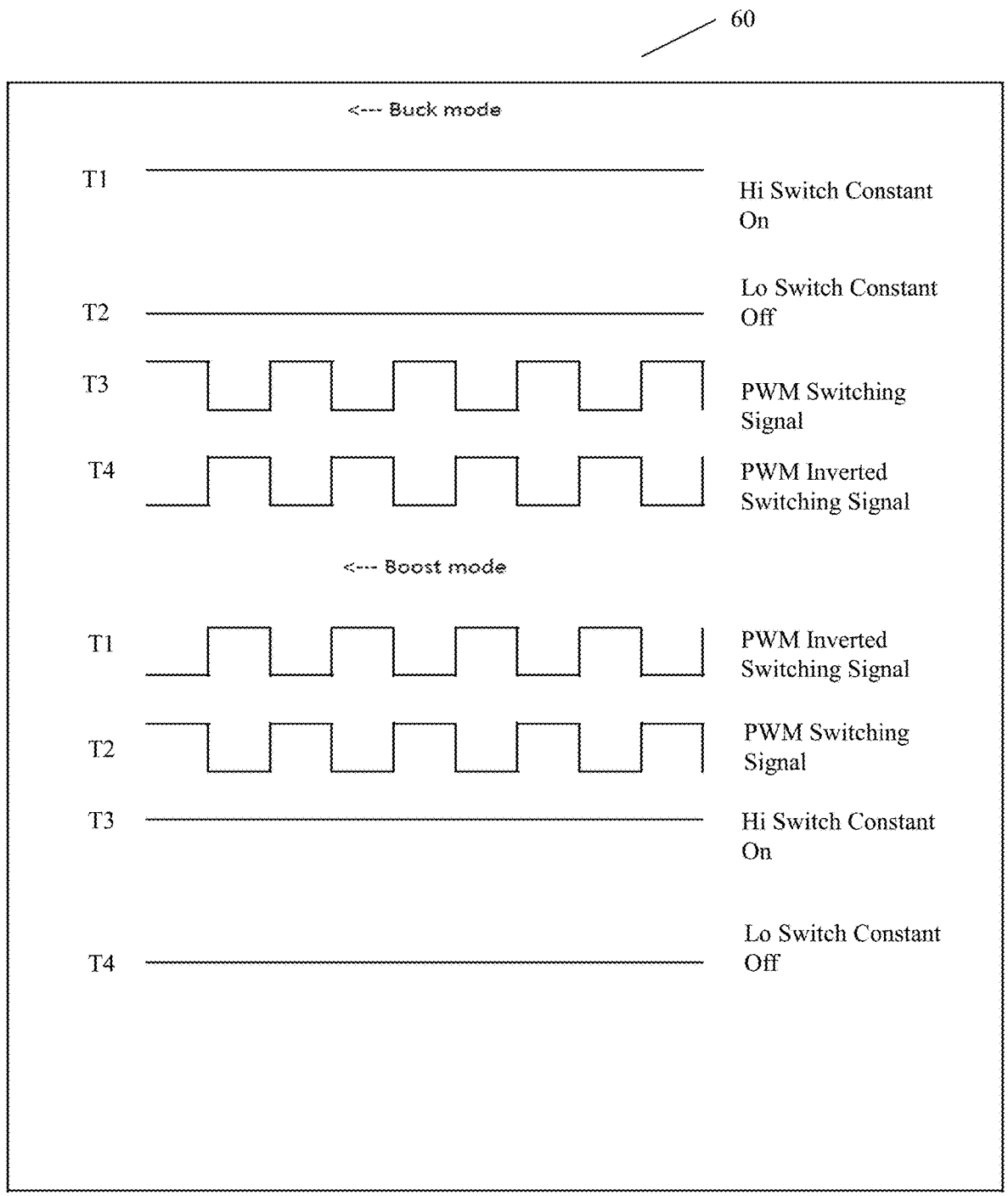
FIG. 6B shows a DC source buck and boosting switches in a reverse current flow from FIG. 6A in accordance with aspects of the present invention.
Figure 6C:
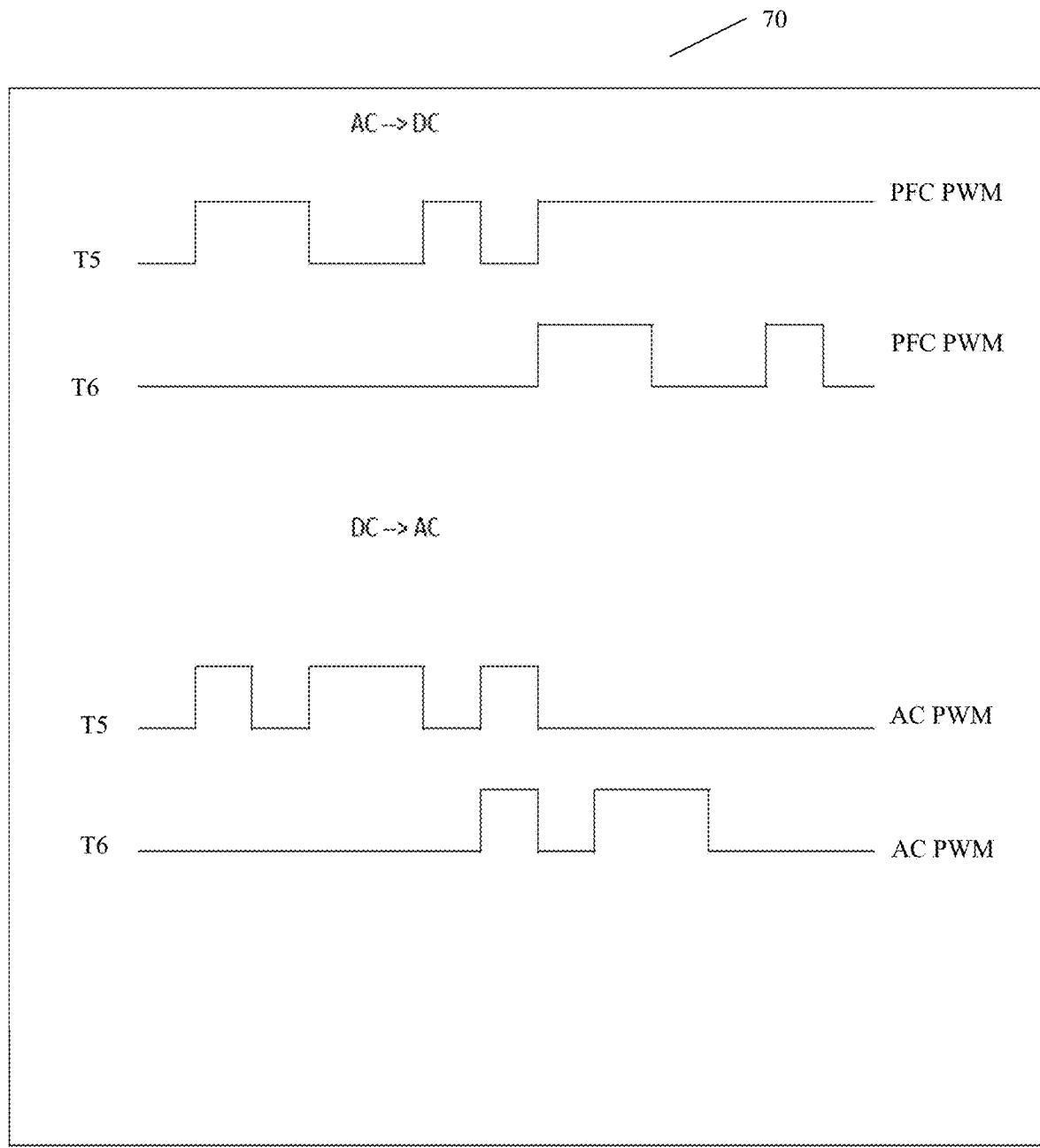
FIG. 6C shows an AC to DC and DC to AC switching in accordance with aspects of the present invention.

FIG. 6A shows a DC source buck and boosting modes in accordance with aspects of the present invention. FIG. 6B shows a DC source buck and boosting modes in a reverse current flow from FIG. 6A in accordance with aspects of the present invention. FIG. 6C shows an AC to DC and DC to AC switching in accordance with aspects of the present invention. In FIGS. 6A-6C, switches of transistors T1-T6 will operate depending on a direction of current flow and a desired inverting or converting of current. Further, pre-established programs from an external digital controller (e.g., controller 10) will consider metered information such as voltage and current flow at multiple points in a circuit and adjust pulse width modulation (PWM) signals to maintain a desired output. The phase of interleaving channels for interleaving PWM switching is dependent on the number of channels in interleaving, and programming may be adjusted for any number of channels.

In particular, FIG. 6A shows that in a buck (i.e., lowering) mode of the graph 50, transistor T1 of FIG. 1B has a pulse width modulation (PWM) switching signal and transistor T2 of FIG. 1B has a pulse width modulation (PWM) inverted switching signal. Further, in a buck (i.e., lowering) mode of the graph 50 of FIG. 6A, transistor T3 of FIG. 1B receives a high switch constant on signal, which ensures that the transistor T3 is always on. In a buck (i.e., lowering) mode of the graph 50 of FIG. 6A, transistor T4 of FIG. 1B receives a low switch constant on signal, which ensures that the transistor T4 is always off. Further, the buck mode in FIG. 6A lowers the output voltage of the inverter-converter system 5 and has a current flow towards the right (as indicated by the arrow pointing to the right).

FIG. 6A also shows that in a boost (i.e., higher) mode of the graph 50, transistor T1 receives a high switch constant on signal, which ensures that the transistor T1 is always on. In the boost (i.e., higher) operating condition of the graph 50, transistor T2 receives a low switch constant off signal, which ensures that the transistor T2 is always off. In the boost (i.e., higher) mode of the graph 50, transistor T3 receives a pulse width modulation (PWM) inverted switching signal and transistor T4 receives the pulse width modulation (PWM) switching signal. Further, the boost mode in FIG. 6A increases the output voltage of the inverter-converter system 5 and has a current flow towards the right (as indicated by the arrow pointing to the right).

FIG. 6B shows that in a buck (i.e., lowering) mode of the graph 60, transistor T1 of FIG. 1B receives a high switch constant on signal, which ensures that the transistor T1 is always on. In the buck (i.e., lowering) mode of the graph 60, transistor T2 of FIG. 1B receives a low switch constant off signal, which ensures that the transistor T2 is always off. In the buck (i.e., lowering) mode of the graph 60, transistor T3 receives a pulse width modulation (PWM) switching signal. In the buck (i.e., lowering) mode of the graph 60, transistor T4 receives a pulse width modulation (PWM) inverted switching signal. Further, the buck mode lowers the output voltage of the inverter-converter system 5 and has a current flow towards the left (as indicated by the arrow pointing to the left).

FIG. 6B also shows that in a boost (i.e., higher) mode of the graph 60, transistor T1 of FIG. 1B receives a pulse width modulation (PWM) inverted switching signal. In the boost (i.e., higher) mode of the graph 60, transistor T2 receives a pulse width modulation (PWM) switching signal. In the boost (i.e., higher) mode of the graph 60, transistor T3 receives a high switch constant on signal, which ensures that the transistor T3 is always on. In the boost (i.e., higher) mode of the graph 60, transistor T4 receives a low switch constant off signal, which ensures that the transistor T4 is always off. Further, the boost mode in FIG. 6B increases the output voltage of the inverter-converter system 5 and has a current flow towards the left (as indicated by the arrow pointing to the left).

FIG. 6C shows an AC to DC and DC to AC switching in accordance with aspects of the present invention. In an operating condition for converting AC to DC power in the graph 70 of FIG. 6C, transistors T5 and T6 of FIG. 1B receive a power factor correction pulse width modulation (PFC PWM). In particular, the power factor correction (PFC) can correct a line current of a power supply by producing a sinusoidal input current waveform that is in phase with a line input voltage. In an operating condition for converting DC to AC power in FIG. 6C, transistors T5 and T6 of FIG. 1B receive an alternating current pulse width modulation (AC PWM).

A field programmable gate array (FPGA) digital design 8-bit pulse width modulator controls a switching signal for each MOSFET in FIG. 1B (e.g., transistors T1-T18) proportional to a duty cycle given by an input value received from a microcontroller (e.g., controller 10). An input pulse width modulation (PWM) value can be static, which is set by a user for a constant duty cycle output, or a closed loop cycle that interprets output current and voltage and adjusts the duty cycle appropriately to match a desired output. The latter method is desirable in use cases where a source power, a power drain, or both the source power and the power drain are variable.

A high input/output pin density of an FPGA device allows for multiple PWM control channels. Depending on an application, a control board is designed for up to twelve channels of synchronous PWM control totaling twenty four high speed PWM outputs (although any amount of channels can be used). Of twelve channels, any amount can be in an interleaving set. Interleaving PWM is an ability to parallel operate a switching device (i.e., buck, boost, inverter) by creating equally spaced switching wave forms depending on a number of channels being used. In embodiments, the FPGA device and the pulse width modulator can be included in the controller 10 of FIGS. 1A and 1B. In an alternative embodiment, the FPGA device and the pulse width modulator can be external to the inverter-converter system 5 and can interface (i.e., receive/send signals) to the inverter-converter system 5 through the controller 10.

Figure 7:
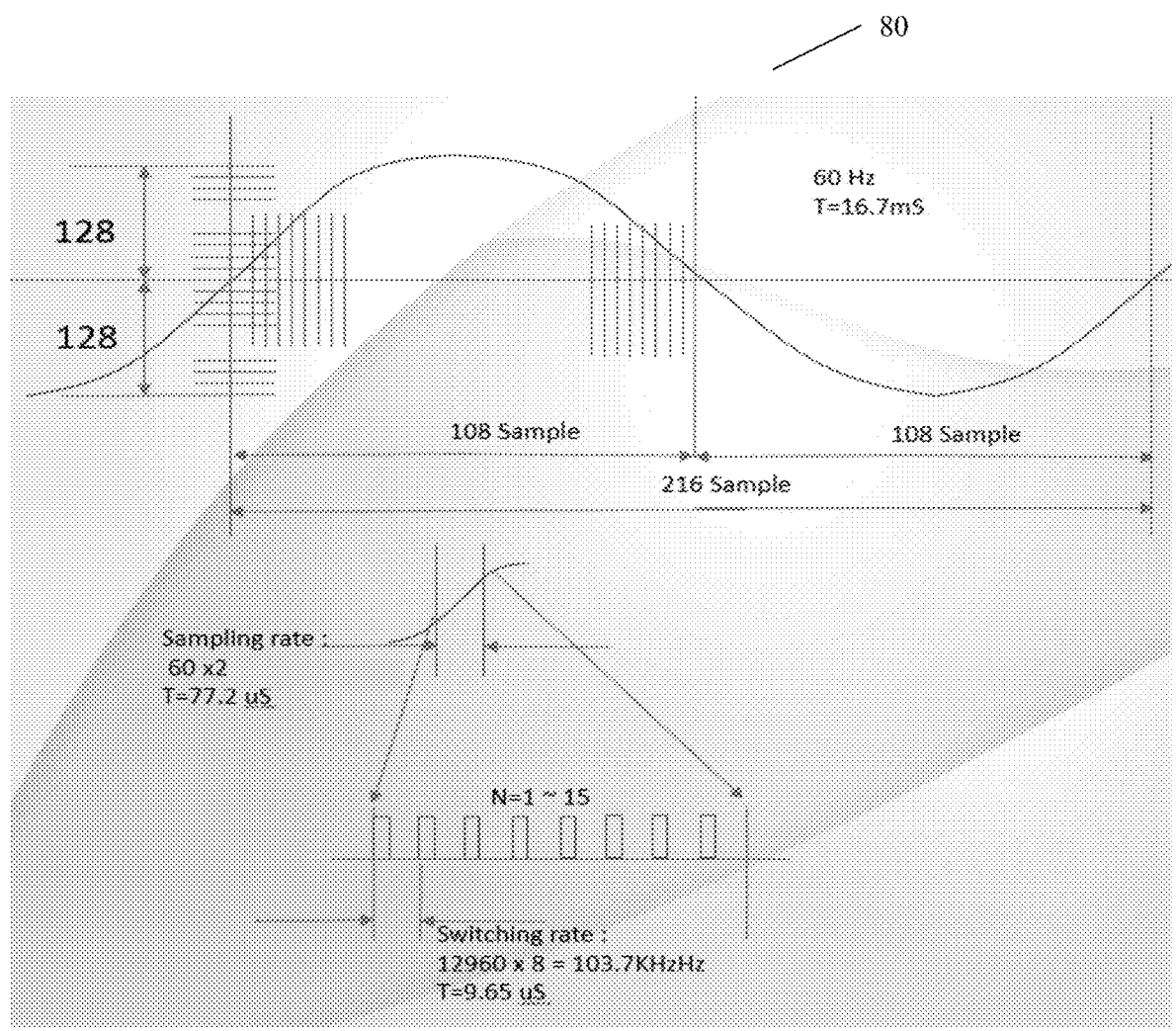
FIG. 7 shows a switching and sampling frequency graph in accordance with aspects of the present invention.

FIG. 7 shows a switching and sampling frequency graph 80 in accordance with aspects of the present invention. For example, the present disclosure uses three channels of an inverter control with an equal spacing of 120 degrees to generate a three phase AC output. Both AC and DC PWN modulators begin by dividing a 106.25 MHz external oscillator clock. A series of clock divider and counters are then used to create a base sampling frequency of 12970 Hz as shown in the graph 80 of FIG. 7. In a DC operation, the base sampling frequency is then multiplied by a default value of eight. In other words, eight times will switch per 12970 Hz cycle to generate a 103.680 kHz as shown in the graph 80 of FIG. 7. The switching rate is adjustable up or down from a default integer of 8, from 1 to 12. In an AC application, the PWM modulator further divides the 12970 Hz frequency by 60 (for 60 Hz sine wave) resulting into 216 which is a number of samples per 60 Hz cycle of a sine waveform as shown in the graph 80 of FIG. 7. An integer value from 0 to 15 (e.g., the default value being 8) will dictate a switching frequency of AC generation PWM. A benefit of variable integer values that change a switching frequency is so that efficiency can be enhanced by means of utilizing passive components characteristics through the load profile of a system.

In conventional circuits, a digitized version of a sine wave can be created using pulse width modulation (PWM) when generating AC power. Further, in conventional circuits, the digitized sine wave can be divided into twelve sample points. In contrast, the present disclosure can divide the sine wave into 216 sample points (as shown in the graph 80 of FIG. 7). In each sample point, a duty cycle is calculated to generate a section of the sine wave.

Figure 8:
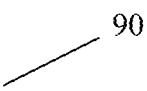
FIG. 8 shows dynamic tuning of switching frequencies in accordance with aspects of the present invention.

FIG. 8 shows dynamic tuning of switching frequencies in accordance with aspects of the present invention. In embodiments of the present disclosure, a higher frequency switching can be achieved in comparison to conventional circuits by using 216 sample points and multiplying the 216 sample points by an N integer, as shown in the table 90 of FIG. 8. In FIG. 8, the selected N integer can be an integer value, e.g., 2, 3, 4, 5, 6, 7, 8, 9, 10, 11, and 12, as shown in the table 90. Further, the output frequency of the table 90 can correspond with the selected N integer values recited above, e.g., 25.920 kHz, 38.880 kHz, 51.840 kHz, 64.840 kHz, 77.76 kHz, 90.72 kHz, 103.680 kHz, 116.640 kHz, 129.60 kHz, 142.56 kHz, and 155.520 KHz.

As a result of multiplying the 216 sample points by an N integer, the sine wave is digitized in many steps as shown in the graph 80 of FIG. 7. Therefore, digitizing the sine wave in the graph 80 of FIG. 7 has much more steps than the conventional circuits. For example, by default, each of the 216 samples for the PWM duty cycle will be executed eight times. Further, the present disclosure reduces the magnetics required to filter the squared switching waveforms and also results in a smooth 60 Hz sine wave.

A phase locked loop (PLL) frequency synthesizer consists of a circuit which has an ability to generate a range of frequencies derived from a single input reference frequency. Further, a power conversion system can be modified to allow an integer value from a control input of a microcontroller (e.g., the controller 10) to dictate an output frequency of the PWM signals. Therefore, combining a phase locked loop integrated circuit and logic within the FPGA device allows for an adjustable switching frequency. In contrast to conventional circuits, the present disclosure allowing for the adjustable switching frequency enables superior tuning and flexibility in the area of power conversion.

In the present disclosure, having the ability to adjust the frequency of PWM signals for DC and AC converters allows for a dynamic tuning of PWM switching frequency based on loads. For example, at a lower load of the inverter converter system 5, it is preferable to switch at higher frequencies to allow operation of magnetics in continuous conduction mode. Further, at a high load of the inverter converter system 5, it is preferable to switch at lower frequencies to allow operation of the magnetics to limit the amount of switching losses.

Figure 9:
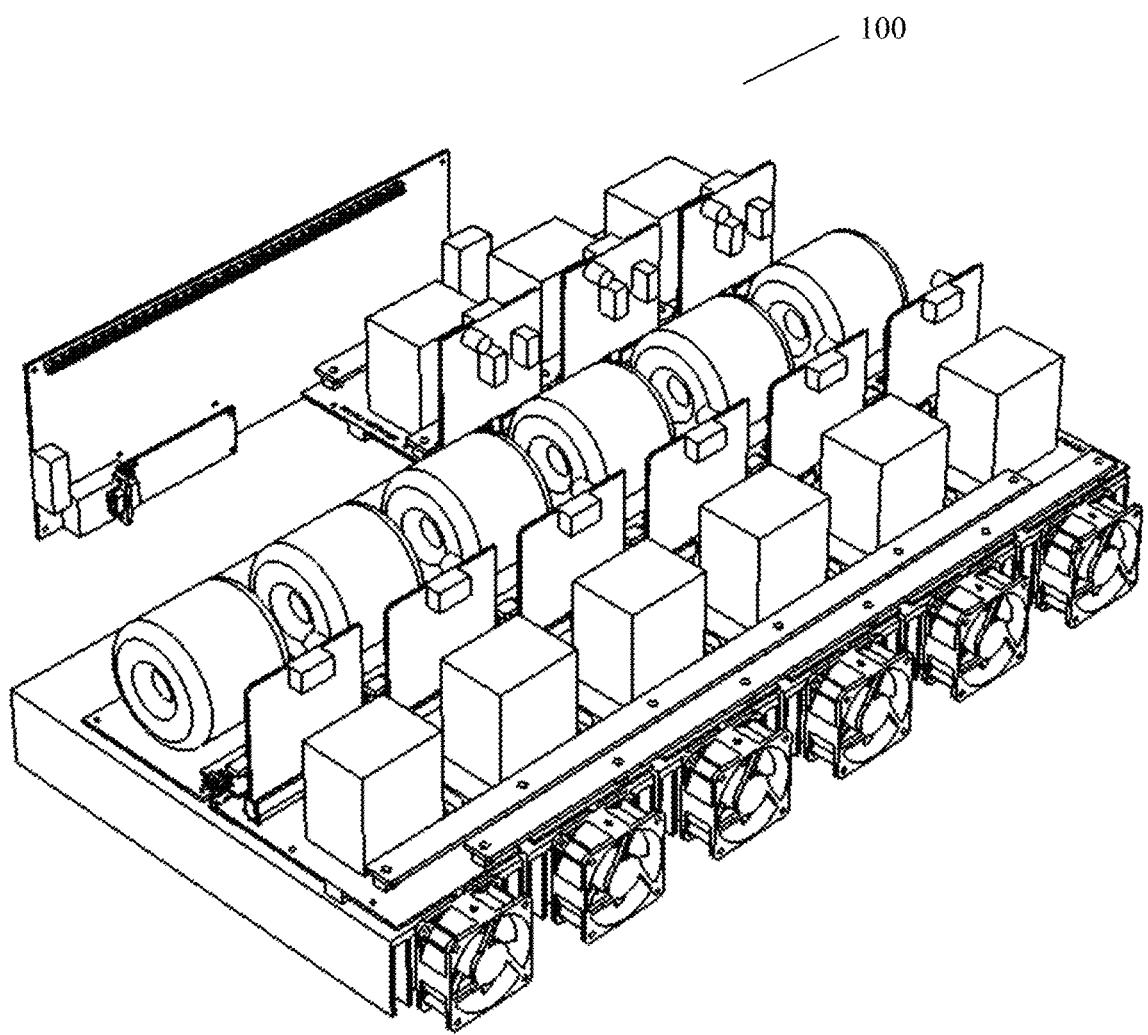
FIG. 9 shows a bi-directional inverter-converter assembly in accordance with aspects of the present invention.
Figure 10:
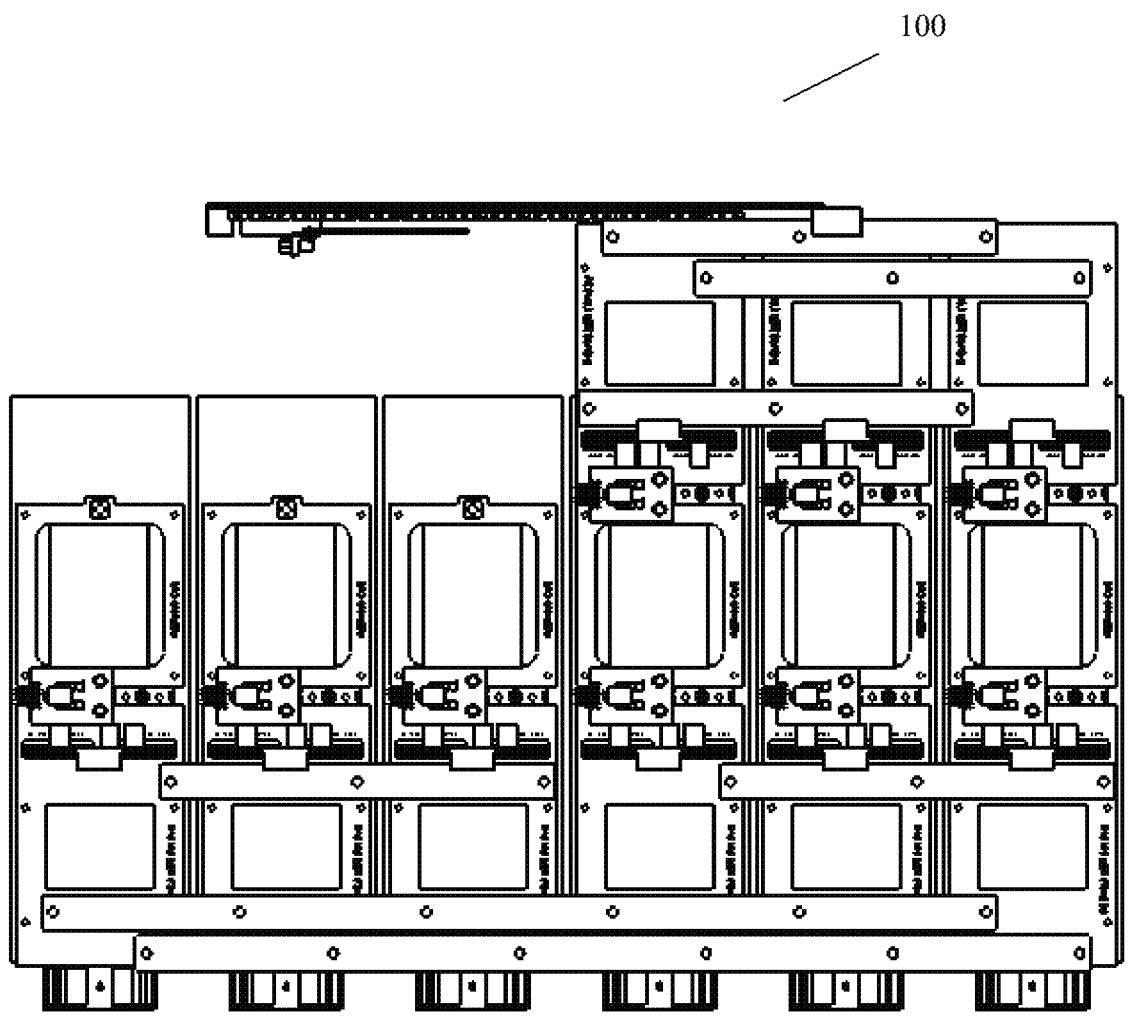
FIG. 10 shows a top view of the bi-directional inverter-converter assembly in accordance with aspects of the present invention.
Figure 11:
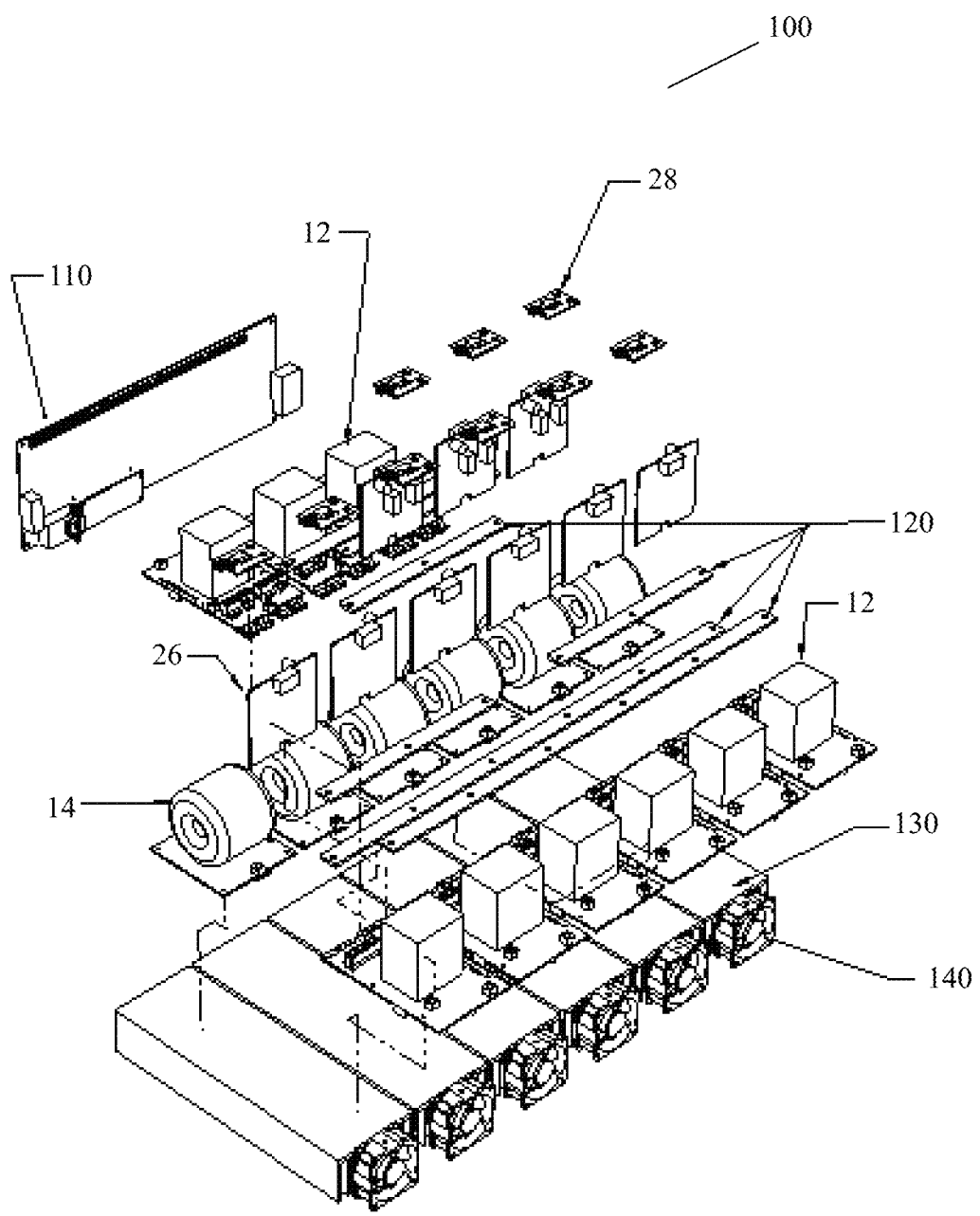
FIG. 11 shows an exploded view of the bi-directional inverter-converter assembly in accordance with aspects of the present invention.

FIG. 9 shows a bi-directional inverter-converter assembly in accordance with aspects of the present invention. FIG. 10 shows a top view of the bi-directional inverter-converter assembly in accordance with aspects of the present invention. FIG. 11 shows an exploded view of the bi-directional inverter-converter assembly in accordance with aspects of the present invention. In FIGS. 9-11, the bi-directional inverter-converter assembly 100 includes the half bridge modules 12, the inductors 14, the gate driver signal boards 26, the current sensors 28, a control board 110, buss bars 120, a heat sink 130, and a fan 140.

In particular, the bi-directional inverter-converter assembly 100 is consistent electrically with the basic-inverter converter circuit schematic diagram of FIG. 1B. Therefore, each of the gate driver signal boards 26 in FIGS. 9-11 are directly connected to the inductor 14 and the half bridge module 12. Further, the half bridge modules 12 are connected to the control board 110. In FIGS. 9-11, the fan may not be required in the bi-directional inverter-converter assembly 100. Also, the heat sink 130 in the bi-directional inverter-converter assembly 100 can be replaced with any type of heat transferring component, e.g., heat pipe, liquid cooling cold plate, etc. The operation of the bi-direction inverter-converter assembly 100 is similar to the operation of basic-inverter converter circuit schematic diagram of FIG. 1B.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving an input value based on a load of an inverter-converter system; and
   dynamically adjusting a switching frequency based on the received input value such that the switching frequency is above a predetermined frequency based on the load being below a predetermined load and the switching frequency is below the predetermined frequency based on the load being above the predetermined load,
   wherein the dynamically adjusting the switching frequency comprises tuning the switching frequency to generate a digitized sine wave by multiplying a plurality of sample points by an N integer to achieve a high frequency switching.

2. The method of claim 1, further comprising controlling a switching signal of the inverter-converter system based on the received input value.

3. The method of claim 2, wherein the switching frequency is a pulse width modulation (PWM) switching frequency.

4. The method of claim 1, wherein the plurality of sample points comprise a number of sample points greater than 100.

5. The method of claim 4, wherein the plurality of sample points comprise 216 sample points.

6. The method of claim 5, wherein the N integer is in a range from two to twelve.

7. The method of claim 1, wherein the inverter-converter system comprises at least one half bridge module connected to at least one current sensor board through at least one metal-oxide-semiconductor field-effect transistor (MOSFET) spring clip, and the at least one current sensor board is connected to a gate driver board and a gate driver single board.

* * * * *